United States Patent [19]

Achiha et al.

[11] Patent Number: 4,811,092
[45] Date of Patent: Mar. 7, 1989

[54] MOVEMENT DETECTOR FOR COMPOSITE COLOR TELEVISION SIGNALS

[75] Inventors: Masahiko Achiha, Iruma; Kazuo Ishikura, Hachioji; Shobu Saito, Yokohama; Masato Sugiyama, Yokohama; Kenji Katsumata, Yokohama, all of Japan

[73] Assignee: Hitachi, Ltd., Tokyo, Japan

[21] Appl. No.: 85,894

[22] Filed: Aug. 14, 1987

[30] Foreign Application Priority Data

Sep. 12, 1986 [JP] Japan ................................. 61-213889

[51] Int. Cl.$^4$ ............................................. H04N 7/18
[52] U.S. Cl. .................................. 358/105; 358/21 R
[58] Field of Search ................ 358/105, 136, 31, 21 R

[56] References Cited

U.S. PATENT DOCUMENTS

| 4,641,180 | 2/1987 | Richter | 358/105 X |
| 4,689,673 | 8/1987 | Ohki et al. | 358/105 X |
| 4,692,801 | 9/1987 | Ninomiya et al. | 358/105 X |

*Primary Examiner*—Howard W. Britton
*Assistant Examiner*—Victor R. Kostak
*Attorney, Agent, or Firm*—Fay, Sharpe, Beall, Fagan, Minnich & McKee

[57] ABSTRACT

A movement detector necessary for processing composite color television signals, which detects movement in image signals, wherein the detecting circuit is so constructed that no deficient motion is produced. A difference signal between the present frame and that preceding by two frames of the television signals is converted into a motion information signal and a movement detection signal is made by integrating the signal obtained by the conversion with respect to temporal axis.

4 Claims, 2 Drawing Sheets

MOVEMENT DETECTOR FOR COMPOSITE COLOR TELEVISION SIGNALS

BACKGROUND OF THE INVENTION

1. Field of the Invention

This invention relates to a movement detector for composite color television signals and in particular to a circuit for extracting information concerning movement of objects contained in composite color television signals, where the subcarrier modulated by color difference signals is combined with luminance signals.

2. Description of the Prior Art

For the processing of composite color television signals according to the NTSC system, in the case where the signal processing utilizing a frame memory is effected for the purpose of improving the picture quality, it is important to detect movement of images in the television signals.

In the composite color television signals the polarity of the modulated chrominance signal is inverted for every scanning line and it is inverted also between the scanning line of the present frame and that preceding frame. A simple frame difference motion detector is not convenient for composite color television signals, since the modulated chrominance signal component appears in the frame difference signal in a still picture. Therefore it was not possible to extract correct information concerning movement of objects.

As a movement detector in composite color television signals known heretofore, there is known a circuit, by which the difference between the signal of the present frame and that of the frame preceding it by two frames is formed and the movement detection output signal is made by forming the absolute value of the difference signal.

This is because, in the color television signals according to the NTSC system, the polarity of the modulated chrominance signal in the scanning line of the present frame and that preceding it by two frames are equal.

There is known also another movement detector, by which a component in the frequency band of the modulated chrominance signal is extracted from the difference signal between the present frame and that preceding by two frames, the magnitude of the difference signal represents as information concerning movement in the frequency band of the modulated chrominance signal; at the same time the difference signal between the present frame and that preceding by one frame is made pass through a low pass filter in order to extract its low frequency components; movement of the low frequency components of the luminance signal is extracted by forming their absolute value and finally a movement detection signal is made by combining these two information signals concerning movement of images.

By the movement detector described above by which movement information is obtained from the difference signal between the present frame and that preceding frame by two frames to be "no movement" when the television image is still one, it is correctly judged. However, when an object moves with a high speed, there is a problem that its movement is sometimes not detected because of the fact that signals of the frame preceding present one by two frames are used.

On the other hand, by the movement detector, by which a movement detection signal is formed by combining information concerning movement of objects in the frequency band of the modulated chrominance signal with movement in the low frequency components of the luminance signal, since information of the difference between the present frame and that preceding it by one frame is also utilized, the lost motion problem described above occurs more rarely. However the lost motion occurs as well for an object, whose luminance signal level is identical to that of the background and only whose chrominance phase differs therefrom.

SUMMARY OF THE INVENTION

The object of this invention is to provide a movement detector for composite color television signals permitting to remove the problems described above and to detect correctly movement of objects, even if they move with a high speed, so that no lost motion is produced.

In order to achieve, the above object the movement detector in composite color television signal according to this invention is so constructed that detection signal for movement of objects is obtained by temporally integrating a signal, containing movement information obtained from the difference signal between the present frame and that preceding it by two frames over a period of time corresponding to a finite number of past frames.

For a part of an object moving even with a high speed, which cannot be detected by using the two frame difference signal, its movement is detected in past fields or frames of the same pixel or surrounding pixels. If the movement is detected in a finite number of past frame periods by obtaining a two-frame difference signal, the movement signal is always obtained by inputting the difference signal in a motion information converting circuit, which converts it into motion information and integrating its output with respect to temporal axis. And thus, it is possible to prevent occurrence of lost motion problem that a motion of an object cannot be detected.

The above-mentioned and other features and objects of this invention will become more apparent by reference to the following description taken in conjunction with the accompanying drawings.

DESCRIPTION OF THE PREFERRED EMBODIMENTS

Figure 1:
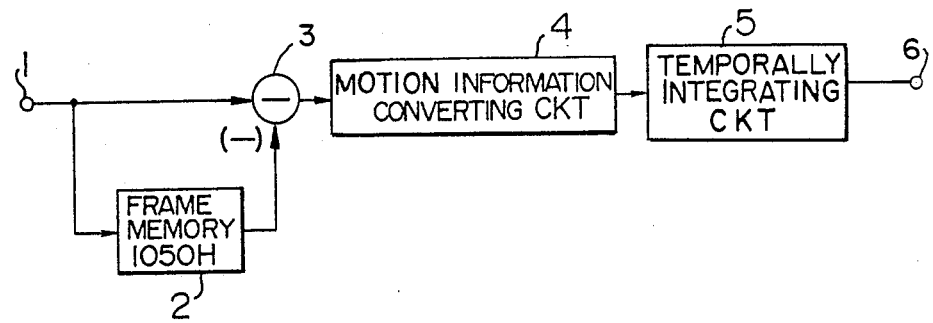
FIGS. 1, 2 and 3 are block diagrams indicating three different embodiments of the movement detector in composite color television signals according to this invention.

Hereinbelow an embodiment of this invention will be explained, referring to FIG. 1. In the figure, a composite color television signal according to NTSC system presented on an input terminal 1 is inputted in a frame memory 2 having a two-frame capacity (1050 H). In a subtractor 3 the difference between the input and the output of the frame memory 2, i.e. the difference between the present frame and that preceding it by two frames, is calculated. Then, it is possible to output desired exact motion information at an output terminal 6 by integrating motion information of the same pixel or surrounding pixels over a finite number of past frame periods by means of a temporally integrating circuit with respect to temporal axis after having transformed the two frame difference signal into a signal representing the movement of the object by means of a motion information converting circuit 4.

Figure 2:
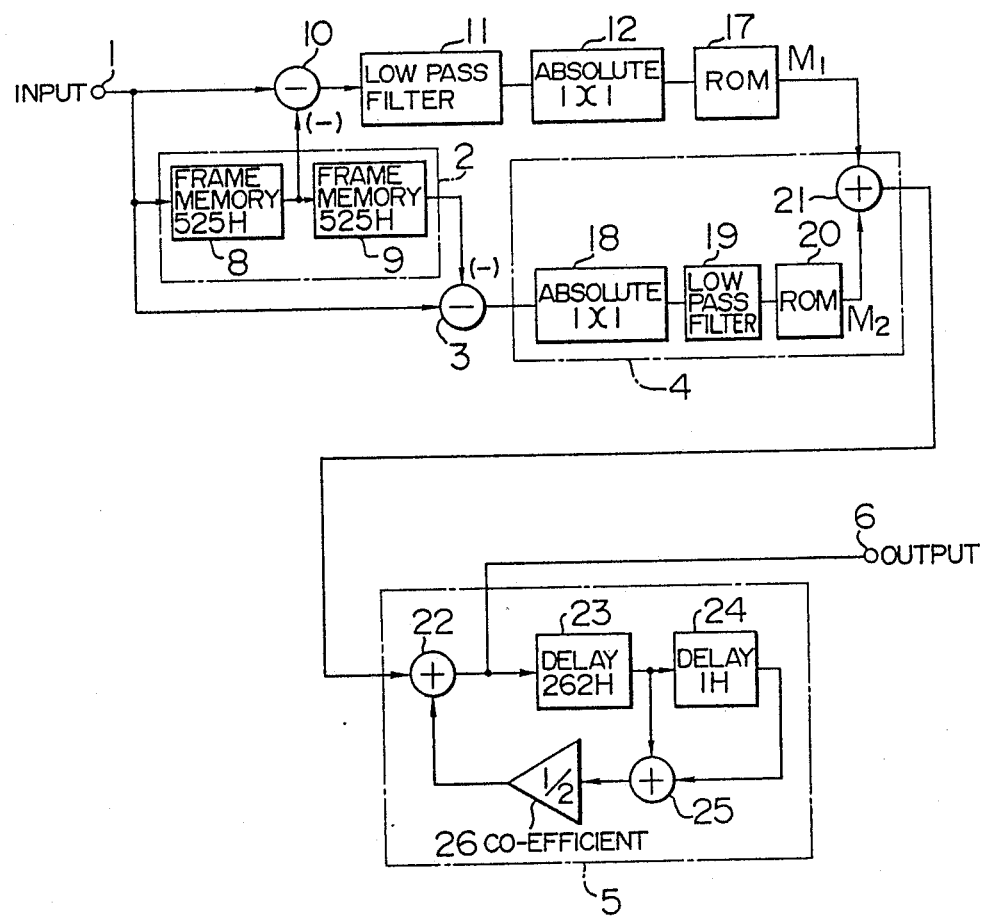

FIG. 2 illustrates the construction of another embodiment of this invention. In the figure, the frame difference signal between adjacent frames and the two frame difference signal between the present frame and that preceding it by two frames are obtained in the subtractors 10 and 3, respectively, by means of two frame memories with one frame capacity (525 H) 8 and 9 connected in cascade. After the modulated chrominance signal has been removed from the frame difference signal by a low pass filter 11, the absolute value of the difference signal is formed by an absolute value forming circuit 12 and transformed into a motion information $M_1$ of the low frequency component in the luminance signal corresponding to the degree of the movement by a read only memory (ROM) 17. On the other hand, the two frame difference signal obtained by the subtractor 3 is transformed into motion information $M_2$ based on the two frame difference, which is the output of an ROM 20, by a motion information converting circuit 4 consisting of an absolute value forming circuit 18, a low pass filter 19, the ROM 20 and an adder 21. The adder 21 combines motion information $M_1$ and $M_2$. Desired motion information is obtained at the output terminal 6 by integrating the sum thus obtained for every field period by means of the integrating circuit 5 with respect to temporal axis, which consists of adders 22 and 25, a field memory (having a capacity of 262 H) 23, a line memory (1 H) and a coefficient circuit 26.

Figure 3:
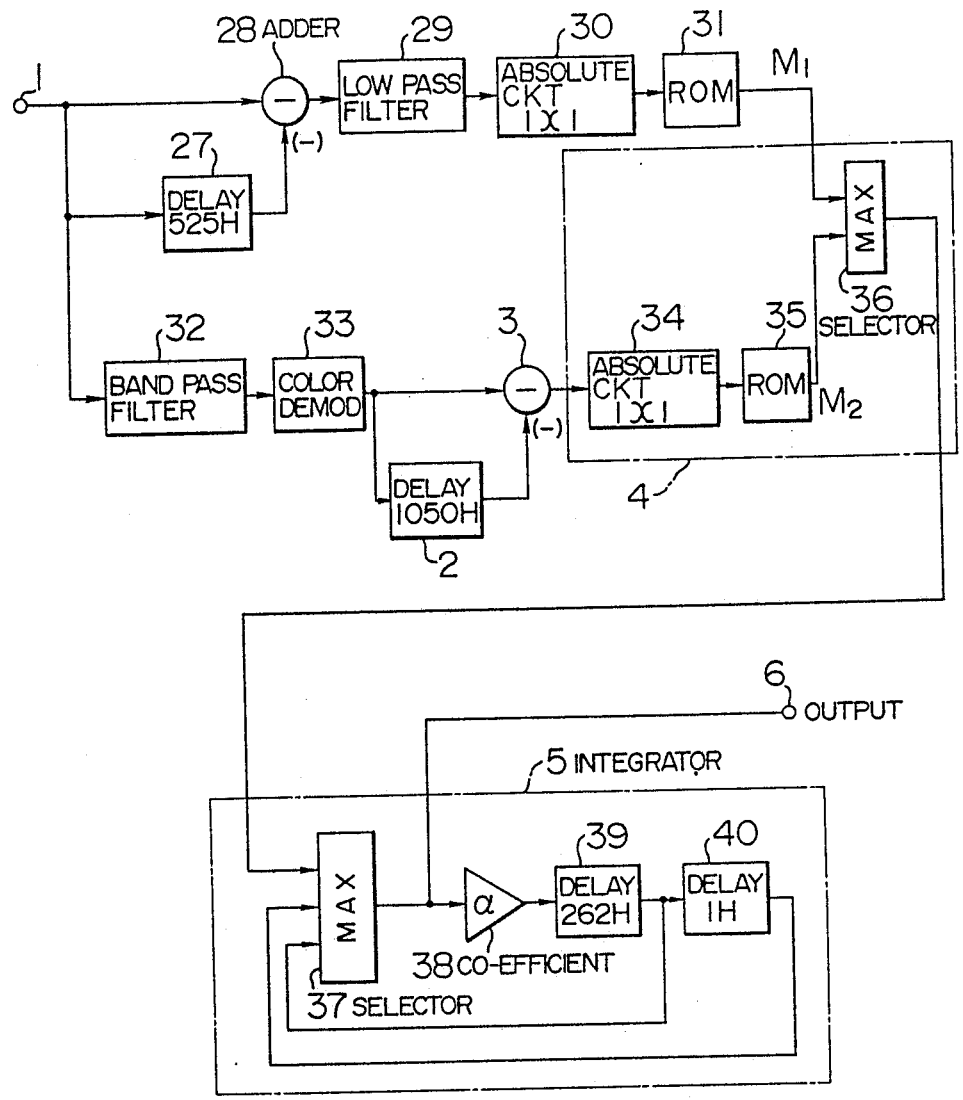

FIG. 3 illustrates the construction of still another embodiment of the movement detecting circuit according to this invention. In the figure, for the luminance signal component in the NTSC signal inputted in the input terminal 1, the motion information $M_1$ is extracted from the low frequency component of the frame difference signal by utilizing a frame memory 27, a subtractor 28, a low pass filter 29, an absolute value forming circuit 30 and an ROM 31, just as for the embodiment indicated in FIG. 2. On the other hand, for the chrominance difference signal, a two frame difference signal is obtained by the frame memory 2 with a two frame capacity and the subtractor 3 after having been demodulated to base band chrominance difference signals by means of a band pass filter (BPF) 32 and a demodulating circuit 33. Then the motion information $M_2$ for the chrominance difference signals is extracted by an absolute value forming circuit 34 and an ROM 35. Signal combining $M_1$ and $M_2$ is done by a maximum value selector (MAX) 36 selecting which is greater between $M_1$ and $M_2$. The selected motion information is integrated by the integrating circuit 5 with respect to temporal axis, which consists of a maximum value selector 37, a coefficient circuit 38, a field memory (having a capacity of 262 H) 39 and a line memory 40. The maximum value of the motion information between the present scanning line and the scanning lines above and below it in the preceding field is outputted at the output terminal 6. The maximum value thus obtained is multiplied by $\alpha$ ($0<\alpha<1$) in the coefficient circuit 38 and fed into the field memory 39, where the integration with respect to temporal axis over a finite number of field periods.

In the embodiment indicated in FIG. 2, it is also possible to input the two frame difference signal obtained by the subtracting circuit 3 in the absolute value forming circuit 18 after having extracted its modulated chrominance signal band therefrom by the BPF. Further it is possible to reduce the necessary number of ROMs by using the ROMs 17 and 20 in common, adding the output of the absolute value forming circuit 12 and the output of the LPF 19 and transforming the summing output into the motion information by means of the ROM.

In the embodiment indicated in FIG. 3 it may be also possible to realize the temporally integrating circuit 5 with respect to temporal axis over a finite number of field periods by disposing a substrating circuit instead of carrying out a multiplication with the coefficient $\alpha$ and subtracting a certain number from the output of the maximum value selecting circuit 37.

In the embodiments indicated in FIGS. 2 and 3 the integrating circuit 5 with respect to temporal axis carries out the integration for every field period, which has a certain extent not only in the direction of the temporal axis but also in the direction of the vertical axis of a displayed picture. It is possible to realize the integration purely with respect to temporal axis for every frame period by replacing the field memories 23 and 39 and the line memories 24 and 40 by frame memories. The spatial integration effect also is efficient for remedying deficient motion information of the two frame difference signal and the circuit used in the embodiments shows excellent characteristics. Furthermore, although the integrating circuit 5 in the embodiments has an extent in the vertical direction, it is easy to realize an integrating circuit with respect to temporal and spatial axis having an extent in both the vertical and horizontal directions.

According to this invention, effects can be obtained that, in the movement detection using the difference between the present frame and that preceding it by two frames in the color television signal according to the NTSC system, since lost motion can be prevented, it is possible to extract exact motion information and that, when it is applied to various kinds of signal processing circuits adapted to movement of objects, their characteristics are remarkably improved.

We claim:

1. A movement detector in NTSE composite color television signals comprising:
   a frame memory for delaying television signals by two frame periods;
   a subtractor for obtaining the difference between the input and the output signals of said frame memory;
   a motion information converting circuit for obtaining motion information from the output signal of said subtractor; and
   a temporally integrating circuit for integrating the output signal of said motion information converting circuit with respect to temporal axis to obtain a movement detection output signal.

2. A movement detector in composite color television signals according to claim 1, wherein said motion information converting circuit is constituted by an absolute circuit for forming the absolute value of the output signal of said subtractor, a low pass filter, in which the output of said absolute circuit is inputted, and a first ROM addressing the output of said low pass filter, and said integrating circuit includes a field memory and a line memory connected in series, an averaging circuit for forming the average of the input and the output of the line memory, and an adder, which adds said average value to the output of said motion information converting circuit and applies a part of the sum thus obtained to said field memory, the other part thereof being the movement detection signal.

3. A movement detector in composite color television signals according to claim 2, further comprising:

a circuit for obtaining a difference signal between adjacent frames of said television signals;

a circuit for obtaining the low frequency component of said difference signal between adjacent frames;

a second ROM for converting magnitude of said low frequency component into motion information; and a circuit for combining the output of said second ROM to the output of said first ROM.

4. A movement detector in composite color television signals comprising:

a first circuit for obtaining first motion information from the low frequency component of a difference signal between adjacent frames for the luminance signal of an inputted television signal;

a second circuit for demodulating a color signal of the inputted television signal;

a third circuit for obtaining a difference signal between the present frame and that preceding by two frames for the output of said second circuit;

a fourth circuit for obtaining second motion information from the output of said third circuit;

a fifth circuit for combining said first and said second motion information; and an integrating circuit for integrating the output of said fifth circuit to make a part of the value thus obtained the motion detection signal.

* * * * *